US008281426B2

(12) United States Patent
Hui

(10) Patent No.: US 8,281,426 B2
(45) Date of Patent: Oct. 9, 2012

(54) ADAPTER FOR EXISTING ABOVE GROUND POOL RETURN

(75) Inventor: Wing-kin Hui, Hong Kong (HK)

(73) Assignee: Rainbow International Development Limited, Hong Kong (HK)

(*) Notice: Subject to any disclaimer, the term of this patent is extended or adjusted under 35 U.S.C. 154(b) by 624 days.

(21) Appl. No.: 12/551,211

(22) Filed: Aug. 31, 2009

(65) Prior Publication Data

US 2011/0047690 A1 Mar. 3, 2011

(51) Int. Cl.
*E04H 4/00* (2006.01)
(52) U.S. Cl. .......................................................... 4/507
(58) Field of Classification Search ....... 4/496, 507–509
See application file for complete search history.

(56) References Cited

U.S. PATENT DOCUMENTS

| 6,223,359 B1* | 5/2001 | Oltmanns et al. ................. 4/508 |
| 7,661,719 B1* | 2/2010 | Nastri ......................... 285/143.1 |

* cited by examiner

*Primary Examiner* — Huyen Le
(74) *Attorney, Agent, or Firm* — Peninsula IP Group; Douglas Chaikin

(57) ABSTRACT

Disclosed herein is an adapter for allowing add-on devices to be attached to an above ground pool. The adapter includes a housing having a first opening for allowing water in, defining an inlet. The housing having a second opening adapted for compatible connection with an existing above ground pool return fitting. The second opening defining an outlet from which the water flows into the return fitting after traveling through the housing. The housing having an open end and the open end being adapted for receiving a device module. The housing including a means for detecting water flow through the housing, the water detection means physically moving in response to the flow of water; and the device module connectable with the housing and including activation means for activating the device in response to the flow of water.

18 Claims, 3 Drawing Sheets

ADAPTER FOR EXISTING ABOVE GROUND POOL RETURN

FIELD OF THE INVENTION

This invention generally relates to the field of recreational pool products. More particularly, this invention relates to adding various automated devices that are used in connection with above ground pools.

BACKGROUND OF THE INVENTION

An above ground pool is quite different from an "in-ground" pool. While one might ordinarily think that the "in-ground" pool is more complicated because it has a number of different systems to maintain, an above ground pool owner desiring some of the "in-ground" important safety and convenience features creates complex and sometimes difficult issues. In fact, in some way it is more difficult to deal with the above ground pool issues than the "in-ground" pools when it comes to these important safety and convenience features. For example, in an above ground situation, there is. generally speaking no pool house in which to hide away the pool hardware and wires. Generally speaking the above ground facility is far less permanent.

However, the desire to have added safety and convenience features, like an "in-ground" pool is no weaker among above ground pool owners. At those times, it becomes desirable to add various safety and convenience devices to the pool system. For example, the addition of an automated chlorinator gives the pool owner not only added convenience, but safety. The pool water must be maintained at proper chlorine levels regardless of whether it is above or in ground. Manual addition of chlorine can be in itself hazardous. Adding too much or too little chlorine can also have safety related issues. Thus finding an acceptable automated chlorinator or other halogen generating device can be critical to maintaining proper safety levels in the pool water, especially for children.

In order to add such an automated chlorinator or similar device, the current state of the art requires adding an entirely new return fitting. The new fitting needs to be custom made to fit the add-on devices and then adapted to the above ground pool. No use is made of the existing return fitting in the present state of the art.

Quite clearly, this operation is time consuming and relatively expensive. Considering that generally speaking an above ground pool costs far less than an "in-ground" pool, costs are a critical consideration. However, the need for a safe water environment is unaffected by costs, especially where children are the primary or frequent users of the above ground pool.

Additionally, add-on devices such as chlorinators, cleaning sweepers, and other sanitizing devices, would each require their own fittings and then that fitting would need to be adapted to the return fitting of the existing pool or the making of an entirely new fitting, customized for each add-on device. Quite clearly this has the potential of making complicated mess of the plumping and electrical wiring of the above-ground pool system.

Additionally, as complicated as the wiring is, it could also lead the user to have a system, which becomes increasingly harder to use and less enjoyable to operate. The unwieldy nature of such add-on devices would leave the pool owner with the uncomfortable decision of whether to improve the quality of his pool water or to leave his pool's operating system more workable. Surely, it would be preferable for the pool owner not to make sacrifices for the sake of convenience over safety or pool water quality.

Additionally, the unsightly mess of conduit and wires will also act as a deterrent to above ground pool owners seeking to improve their pool systems and the quality of the water. Again, it would seem preferable for the pool owner not to need to choose between safety and lack of usability of his pool.

Previously, attempts have been made directed toward solving this issue. U.S. Pat. No. 7,014,753 discloses replacing the standard above ground pool return fitting. The '753 patent discloses replacing the existing return fitting with a unique uni-body construction. However, such replacement is difficult and requires a fair amount of expertise. In the end the fitting itself is quite complex.

What is needed is a simple method and device for adding safety and convenience devices to above ground pool systems which does not comprise the integrity of the original above ground user's pool system.

SUMMARY OF THE INVENTION

The structure, in accordance with the present invention, comprises an adapter defining a housing having a first opening for allowing water in and defining an inlet. The housing has a second opening adapted for compatible connection with an existing above ground pool return. The second opening defines an outlet from which the water flows after traveling through the housing. The housing has an open end and the open end is adapted to receive a device module. The housing includes a means for detecting water flow through the housing. The water detection means physically moves in response to the flow of water. In a preferred embodiment, the detection means is variable and responds to water flow as being low, medium and high. A device module is connectable with the housing. The device module includes activation means for activating the device in response to the flow of water.

Thus, It is an object of this invention is to provide an above ground pool with the ability to add various devices without detracting from the pool usability.

It is another object of this invention in accordance with this invention, to provide a structure, which requires no particular expertise, in order to adapt an above ground to be fitted with various additional devices, such as chlorinators and circulation pumps.

Its an additional object of this invention to provide a simple construction of a housing which allows users without great cost to adapt his/her above ground to add on move than one device without comprising the aesthetics of the pool system or its usability.

In exemplary embodiment of the housing in accordance with the invention, the housing, comprises:

a housing for an above ground pool, the above ground pool including a return fitting for allowing water to enter the pool, the housing comprising:

a housing having a hollow interior and an open end, an inlet for allowing water to enter the housing and an outlet for returning water to the pool, the outlet having a fitting compatible for mating and removable engagement with the pool return fitting;

a base plate including a device module, the base plate including flow switch for detecting when water enters the housing, the base plate closing off the open end;

a base plate sub-housing having a hollow interior, the sub-housing providing dry interior environment;

a sensor for detecting movement by the flow switch;

whereby, upon water entering the housing, the flow switch moves and the sensor detects the motion of the flow switch.

In another exemplary embodiment, the water detection means comprises a variable means, wherein the level of water pressure is detectable. For example, levels of low medium and high are detectable. The water detection means moves in response to such water pressure and signals the activation means at the appropriate level. The activation means then responds, according to a predetermined set of instructions, to activate the device module at an appropriate level.

In another exemplary embodiment of the adapter in accordance with this invention, there is a full line of devices readily interchangeable with the housing. For example, a chlorinator, a pool circulation pump and other sanitation and pool cleaning devices, both known and unknown, for which this invention places no restriction which are enabled by connection to the housing.

In accordance with the objects set forth above and those which will be described more fully below, the adapter in accordance with this invention, comprises:

a housing having a hollow interior and an open end, an inlet for allowing water to enter the housing and an outlet for returning water to the pool, the outlet having a fitting compatible for mating and removable engagement with the pool return fitting, the inlet including a shunt means for selectively blocking the flow of water into the housing;

a base plate including a device module, the base plate including flow switch for detecting when water enters the housing, the base plate closing off the open end;

a base plate sub-housing having a hollow interior;

a sensor for detecting movement by the flow switch;

whereby, upon water entering the housing, the flow switch moves and the sensor detects the motion of the flow switch.

It is an advantage of the adapter in accordance with this invention to provide a means for allowing an above ground pool to add a devices for sanitizing and cleaning the pool, without sacrificing the usability of the pool or the esthetic look of the pool system.

It is an additional advantage of the adapter in accordance with this invention to provide such a means for adding devices within the budget of the typical pool owner for such above ground pools.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

In order to appreciate the invention herein, one must appreciate the need in the art as set forth in the Background. Most importantly, the structure herein for resolving the long felt need to increase the actual, real life ability of an above ground pool owner to add various devices to his/her pool system to sanitize the water, clean the pool and various other devices which make owning such an above ground pool both desirable and safe.

Figure 5:
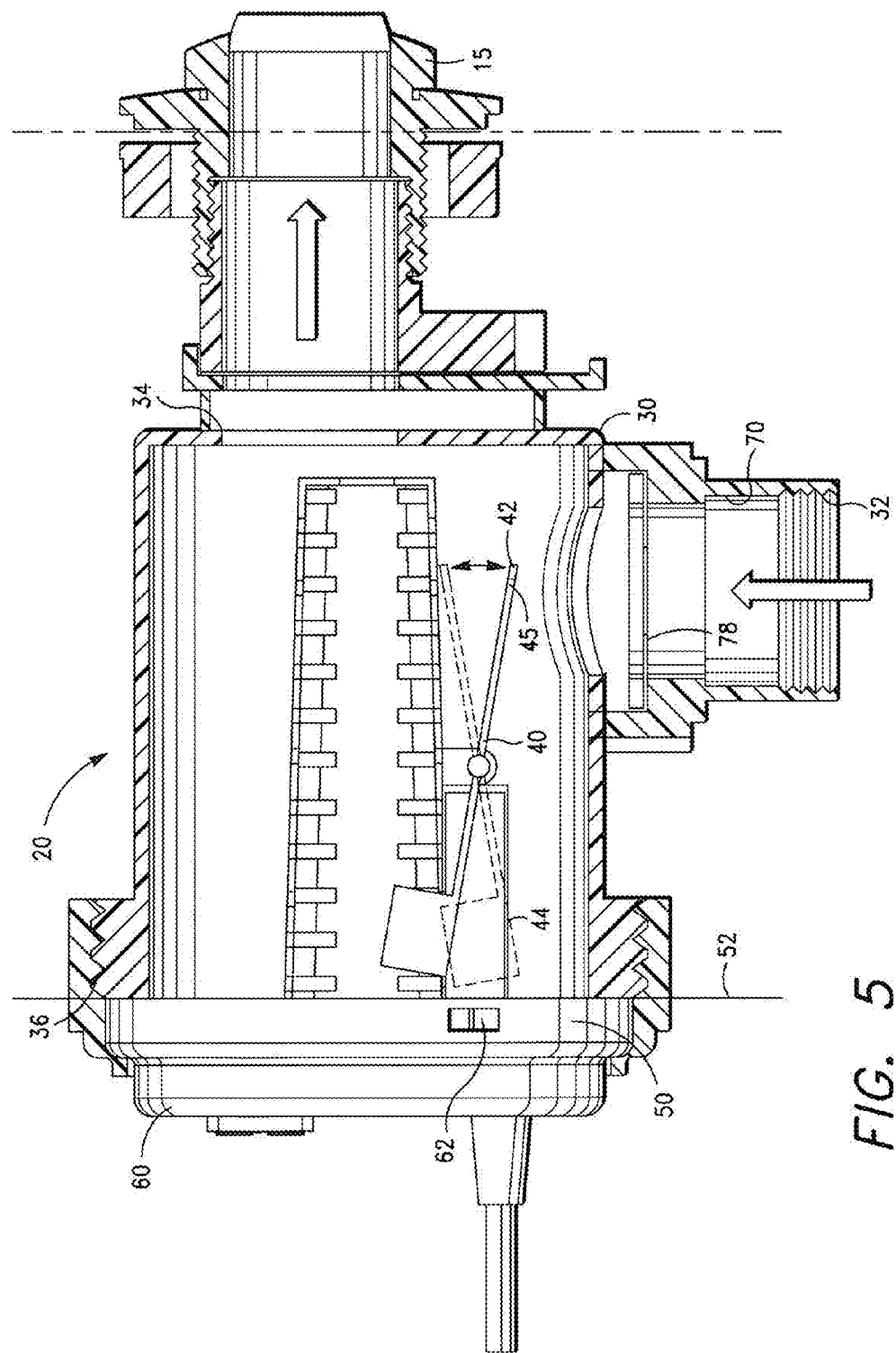
FIG. 5 is a side plan of the assembled housing in accordance with this invention connected to the existing return fitting of an above ground pool.

An exemplary embodiment of the adapter in accordance with this invention is clearly illustrated in FIG. 5 and designated by the numeral 20. The adapter defines a housing 30 which is sized and shaped for mating engagement with the return fitting 15 of the existing above ground pool.

The housing 30 has a first opening 32 defining an inlet and a second opening 34, which defines as an outlet. The housing 30 has an open end 36 for accepting the device module 60.

A flow meter switch 40 is connected to the housing 30. The switch 40 is rotatably connected to the housing at the approximate middle portion of switch as will be described more fully with respect to FIG. 3 below. The switch 40 has a first end 42 defining a water flow sensing member for sensing water flow through the inlet 32.

The flow meter switch 40 has a second end 44. The second end includes sensor means for communicating movement of the switch 40 in response to water flow through the inlet.

Figure 3:
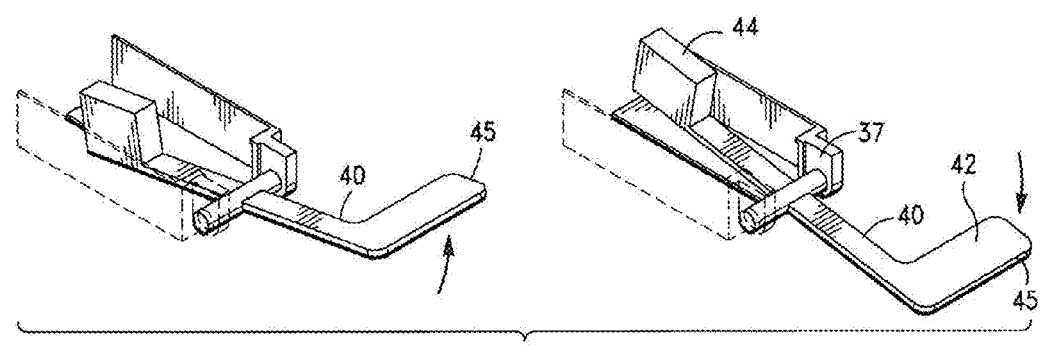
FIG. 3 is a perspective view of the flow switch of the housing in accordance with this invention, the flow switch moving from a first position to a second position in response to water flow.
Figure 4:
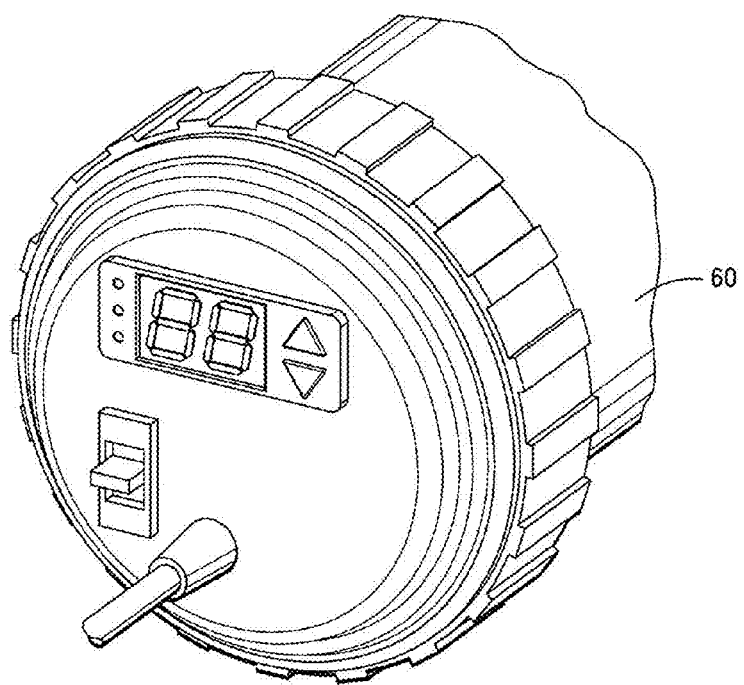
FIG. 4 is a perspective view of a device module compatible with connection to the housing in accordance with this invention.

With particular reference to FIG. 3, the flow meter switch 40 is shown rotatably connected to the housing 30. The switch 40 is hinged at hinging member 37, which defines part of the housing 30. The hinging member includes a pinion member 39 having a slot for allowing the first end 42 of the switch 40 to be thread through the member 39. As is appreciated from FIG. 3, the switch 40 can be thread through until the middle portion is reached, so that the switch 40 rotates generally about the middle portion as shown.

Also, as shown, the first end 42 defines a vane portion 45. The connection to the housing is adjusted so that the vane portion 45 lies directly in the path of water through the inlet 32.

In an exemplary embodiment, the second end includes a magnet. As the switch 40 move from a first position to a second position as clearly shown in FIGS. 3 & 5, the magnet moves in response to water pressure created by the water flowing through the housing 30. Thus, as water flows the magnet moves from a first position to a second position. The first position indicates no water flow and the second position indicates water flowing through the housing 30.

In an exemplary embodiment, the flow switch 40 defines a variable flow switch. Thus, in one embodiment the flow switch senses low, medium and high water pressure. The switch 40 moves according to the amount of water pressure experienced by the housing 30.

FIG. 5 illustrates a flow switch having two states. The first state is a normally urged state indicating a "no-flow" state. In the second position, indicated by the phantom lines of the flow switch 40 in FIG. 5. In the variable flow switch embodiment, the ends of the switch move from one state to the other and stop at various points in between, representing the space proportional with the water flow.

The second end 34 of the housing 30 is simply screwed into the standard or existing return fitting 15. Quit clearly the housing 30 serves as an adapter, once secured into the return fitting. At that point any device module 60, which fits into open end and is secured to the housing serves as an acceptable add-on. Thus, while the device module 50 illustrated is ostensibly a chlorinator, any device module 50 fitting the above criteria would operate equally successfully within the housing 30.

The device module 50 simply screws into the open end 36. The module 50 is secured thereto. As noted above, the module may define a chlorinator, a pump for pool water circulation as well as other devices needed to promote convenience and water safety and sanitation.

The device module 50 includes a sensor for detecting movement of the flow switch. In the exemplary embodiment wherein the second end of the switch 40 includes a magnet, while the device module includes a reed switch 62. The reed switch 62 senses the movement of the magnet and responds accordingly activating the chlorinator as appropriate. In the case of a variable switch 40, the activation level is predetermined and can be set to the appropriate level proportionate to the water pressure through the housing 30.

As will be appreciated by those skilled in the art, it is critical for longevity of the module that the sensor stays dry and in the best possible environment for such electrical devices. A base plate 50 along line of demarcation 52 separates the device module 50 behind the dry side of the housing 30. The entire device module 50, is connected to the base plate 50. The base plate 50 has external threads, which match and compatibly mate with the threads of the open end 36. By establishing the line of demarcation between the dry and often wet environments within the housing, the sensor stays dry and remains reliable throughout its entire life.

The base plate includes a sub-housing having a hollow interior. Within the hollow interior, the sensor for detecting movement of the switch 40 is fixed. Upon sensing movement, the sensor transmits, within the dry environment, the appropriate signals.

Figure 1:
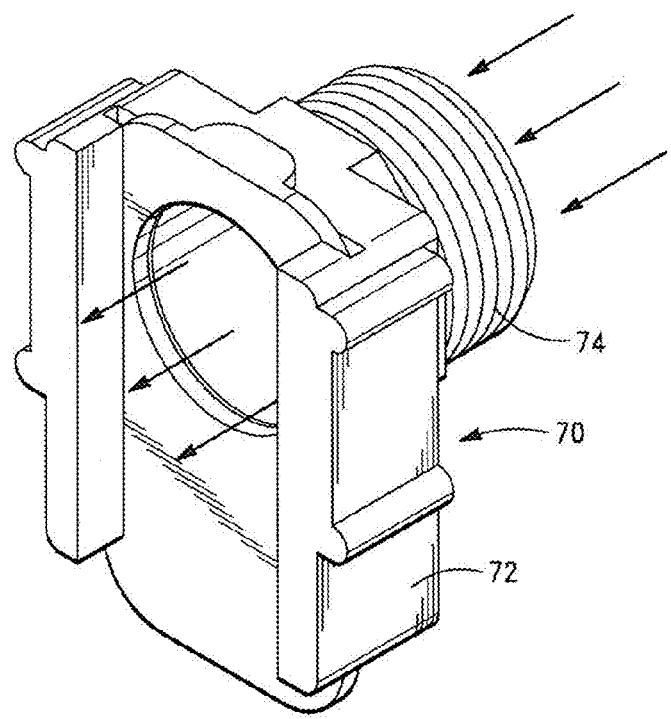
FIGS. 1 & 2 are perspective views of the shut off member for the housing in accordance with this invention having a U-shaped cathode and with the anode extending in at least one dimension.
Figure 2:
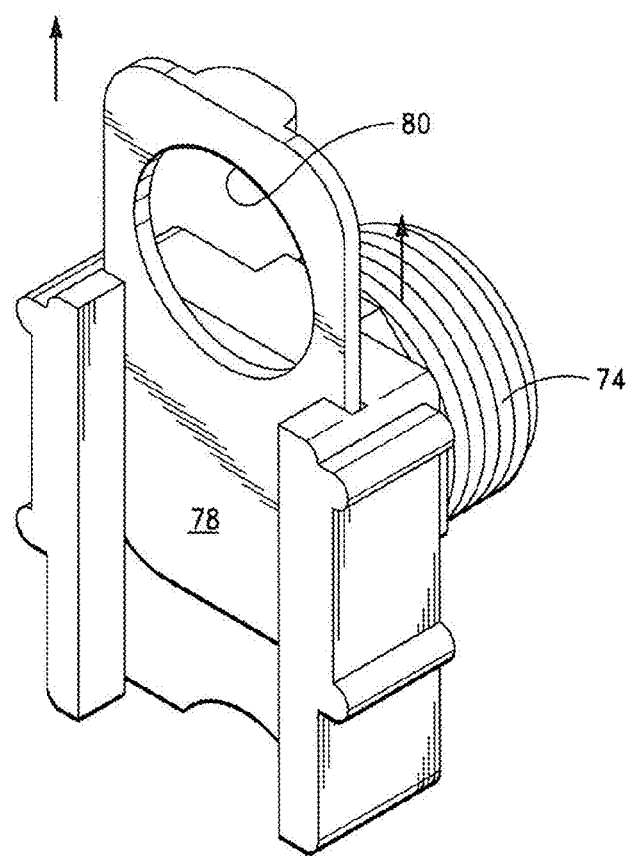

With respect to FIGS. 1 & 2, there is illustrated, the shunt means generally designated by the numeral 70. The shunt means 70 includes a sub-housing assembly 72 having a fitting 74 for connection with the water source. The sub-housing assembly 72 has a set of grooves 76 and a shunt 78 having an open end 80.

The shunt means 70 is positioned within the housing 30 as illustrated in FIG. 5. The shunt means 70 is positioned such that the shunt 78 is in the direct path of the water flow. Additionally, the shunt closed end is positioned such that the water flow is completely closed with the closed end in position on the sub-housing assembly 72 for blocking the flow of the water through the housing 30. The shunt 78 is sized and shaped to provide adequate size and shape for such blocking Likewise, the open end 80 is also sized and shaped to provide an opening through which water can proceed unimpeded.

Once installed within the housing 30 the shunt assembly allows quick and efficient change of device modules 50. Once the water intake is secured by moving the closed end of the shunt 78 into place, the device module 50 may be safely interchanged with another device module 50. Even where water is flowing into the housing, the device module can be safely interchanged with another.

While the foregoing detailed description has described several embodiments of the adapter in accordance with this invention, it is to be understood that the above description is illustrative only and not limiting of the disclosed invention. Thus, the invention is to be limited only by the claims as set forth below.

What is claimed is:

1. An adapter for an above ground pool, the above ground pool including a return fitting for allowing water to enter the pool, the adapter comprising:
    a housing having a first opening for allowing water in, defining an inlet, the housing having a second opening adapted for compatible connection with an existing above ground pool return fitting, the second opening defining an outlet from which the water flows into the return fitting after traveling through the housing, the housing having an open end and the open end being adapted for receiving a device module;
    the housing including a means for detecting water flow through the housing, the water detection means physically moving in response to the flow of water; and
    the device module connectable with the housing and including activation means for activating the device in response to the flow of water.

2. The adapter as set forth in claim 1, wherein the water detection means comprises a variable detection means, which responds to water flow as being low, medium and high and wherein the activation means senses such a variable signal.

3. A housing for an above ground pool, the above ground pool including a return fitting for allowing water to enter the pool, the housing comprising:
    a housing having a hollow interior and an open end, an inlet for allowing water to enter the housing and an outlet for returning water to the pool, the outlet having a fitting compatible for mating and removable engagement with the pool return fitting;
    a base plate including a device module, the base plate including flow switch for detecting when water enters the housing, the base plate closing off the open end;
    a base plate sub-housing having a hollow interior, the sub-housing providing dry interior environment;
    a sensor for detecting movement by the flow switch;
    whereby, upon water entering the housing, the flow switch moves and the sensor detects the motion of the flow switch.

4. The housing for an above ground pool, as set forth in claim 3, wherein the housing includes a device module within the base plate sub-housing.

5. The housing for an above ground pool, as set forth in claim 4, wherein the device module, comprises a halogen generator.

6. The housing for an above ground pool, as set forth in claim 4, wherein the device module, comprises a chlorinator.

7. The housing for an above ground pool, as set forth in claim 4, wherein the device module, comprises a pump for circulating water around the pool.

8. The housing for an above ground pool, as set forth in claim 3, wherein the flow switch has a first end defining a vane member, sensitive to water pressure and locate in the path of the flow from the inlet and a second end having a sensor.

9. The housing for an above ground pool, as set forth in claim 8, wherein the flow switch is mounted rotatably in the interior of the housing, as water enters the housing the flow switch moves from a first position to a second position in response to water flow.

10. The housing for an above ground pool, as set forth in claim 9, wherein the flow switch the vane member moves toward the center of the housing interior and wherein the second end moves away from the center and wherein the second end of the flow having the sensor is located proximate the base plate.

11. The housing for an above ground pool, as set forth in claim 10, wherein the base plate sub housing includes the sensor for detecting movement of the second sensor end of the flow switch; and wherein base plate sub-housing includes means for changing the activation state of the device module.

12. The housing for an above ground pool, as set forth in claim 11, wherein the flow switch moves in response to water flow and wherein upon such movement the sensor in the base plate sub-housing signals the means for state activation change and the device module is activated.

13. The housing for an above ground pool, as set forth in claim 12, wherein the flow switch is normally urged in a first position, the first position defining the state where water does not flow into the housing and wherein upon water ceasing to flow into the housing the flow switch moves back to its first position and wherein, the means for state activation change signals the device module to de-activate.

14. The housing for an above ground pool, as set forth in claim 11, wherein the flow switch is made from plastic material.

15. A housing for an above ground pool, the above ground pool including a return fitting for allowing water to enter the pool, the housing comprising:
- a housing having a hollow interior and an open end, an inlet for allowing water to enter the housing and an outlet for returning water to the pool, the outlet having a fitting compatible for mating and removable engagement with the pool return fitting, the inlet including a shunt means for selectively blocking the flow of water into the housing;
- a base plate including a device module, the base plate including flow switch for detecting when water enters the housing, the base plate closing off the open end;
- a base plate sub-housing having a hollow interior;
- a sensor for detecting movement by the flow switch;
- whereby, upon water entering the housing, the flow switch moves and the sensor detects the motion of the flow switch.

16. A housing for an above ground as set forth in claim 15, wherein the shunt means includes a sub-housing assembly, the assembly includes a shunt moving slidably within the sub-housing.

17. A housing for an above ground as set forth in claim 16, wherein the sub-housing assembly includes groove members for slidably accepting the shunt.

18. A housing for an above ground as set forth in claim 15, wherein the shunt has a first closed end and a second open end, the closed end blocking off water from entering the housing, while the open end allows water to flow through the housing, the shunt being slidable within the sub-housing from the closed end to the open and vice-versa.

* * * * *